Oct. 26, 1954 — C. F. PARROTT — 2,692,799
PORTABLE SPRAYING APPARATUS
Filed March 17, 1953 — 2 Sheets-Sheet 2
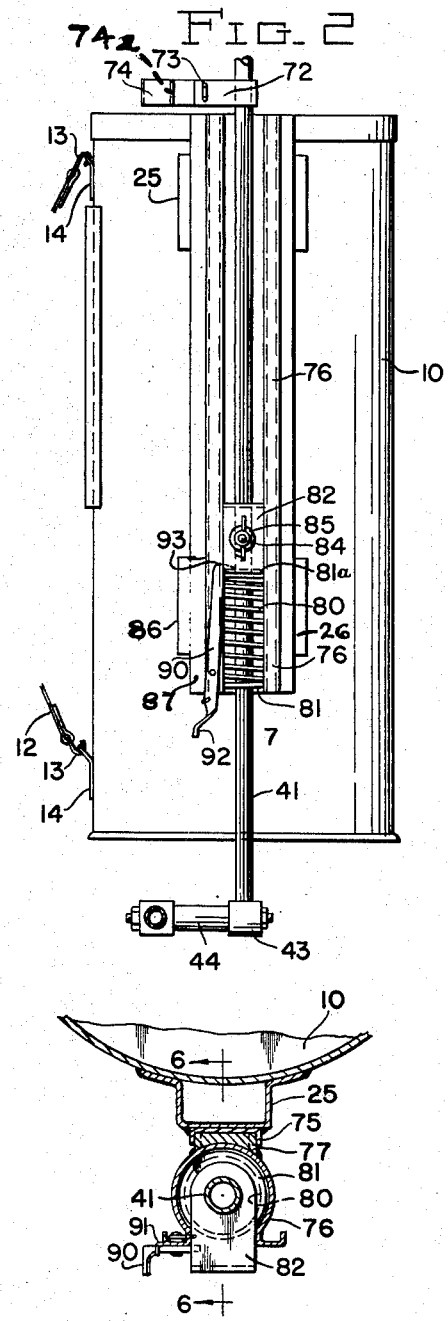
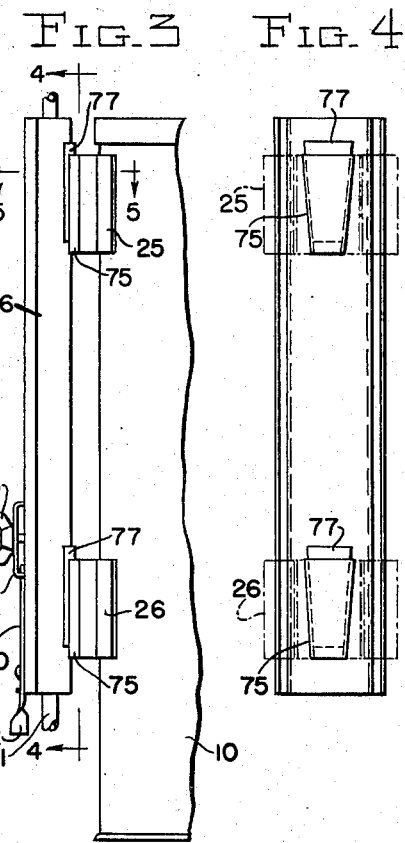
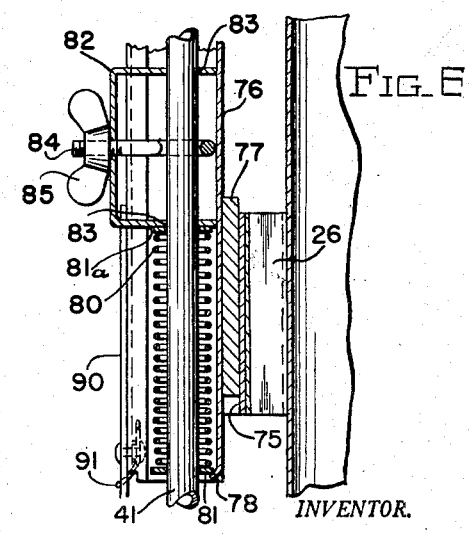
INVENTOR.
CLARENCE F. PARROTT
BY
ATTORNEY Patented Oct. 26, 1954

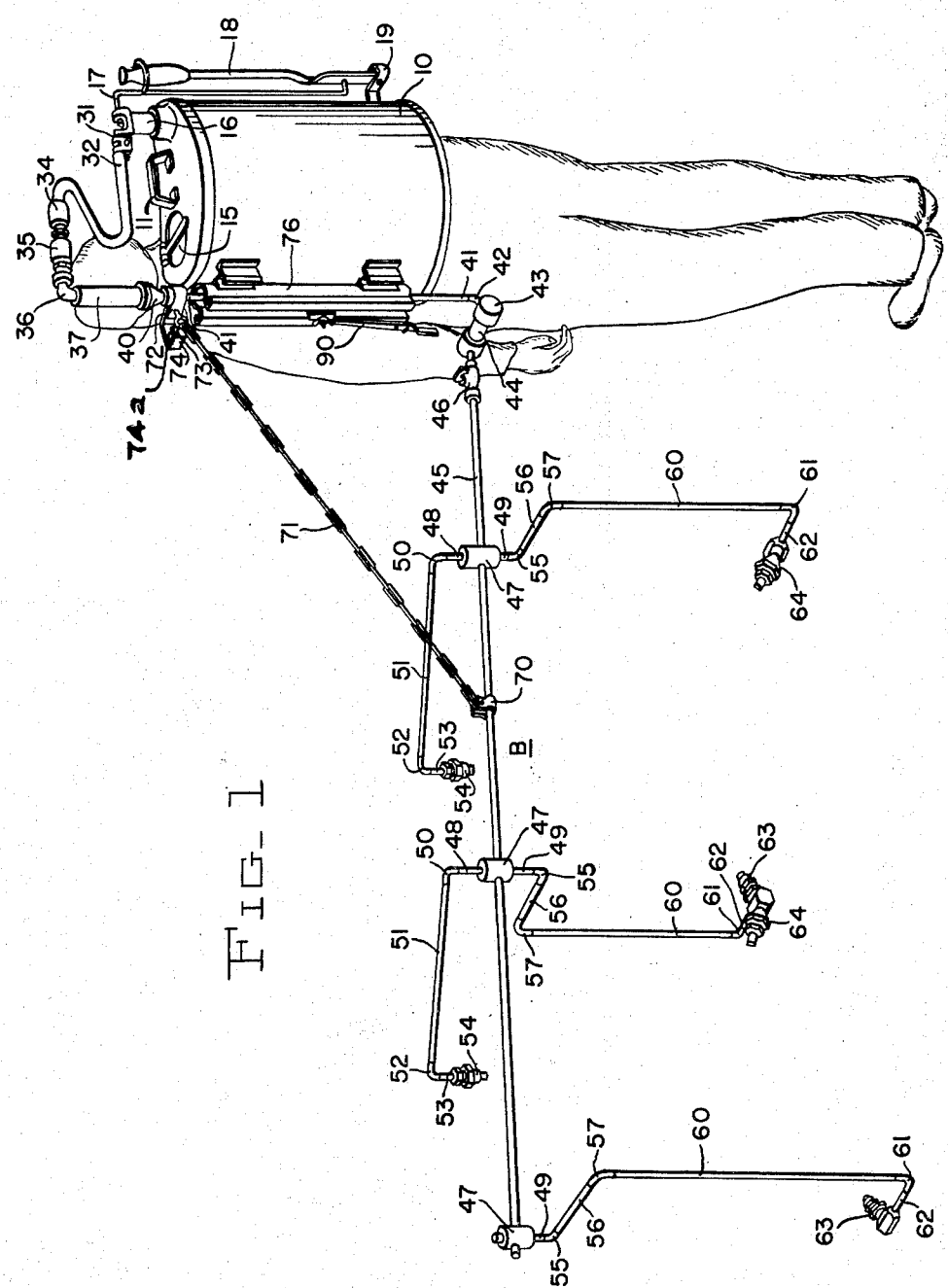

2,692,799

UNITED STATES PATENT OFFICE 2,692,799

PORTABLE SPRAYING APPARATUS

Clarence F. Parrott, Pennsburg, Pa., assignor to Parco Products Company, Pennsburg, Pa., a copartnership Application March 17, 1953, Serial No. 342,777

9 Claims. (Cl. 299—97)

This invention relates to portable spraying apparatus and more particularly to spraying apparatus of the knapsack type.

It has heretofore been the practice with most hand operated portable spraying equipment to use a single spray nozzle. The spraying operations with such equipment are necessarily very time consuming as only a limited area can be covered with a single nozzle and the spraying is limited to a single row application.

In accordance with the present invention improved spraying apparatus is provided with which a plurality of rows may be simultaneously sprayed, and with the spraying for each row directed, if desired, from a plurality of directions.

It is the principal object of the present invention to provide an improved portable spraying apparatus of the knapsack type.

It is a further object of the present invention to provide an improved portable spraying apparatus of the knapsack type that can be adjusted to compensate for the variations in the heights of the users.

It is a further object of the present invention to provide a portable spraying apparatus of the knapsack type that can be readily adjusted from a position for storage to a position for use.

It is a further object of the present invention to provide an improved portable spraying apparatus of the knapsack type that is conveniently portable.

It is a further object of the present invention to provide a portable spraying apparatus of the knapsack type with which a relatively large area may be sprayed.

It is a further object of the present invention to provide a portable spraying apparatus of the knapsack type that is easily adjustable to varying spraying heights and angles.

It is a further object of the present invention to provide a portable spraying apparatus of the knapsack type that can be effectively operated by relatively unskilled labor.

Other objects and advantageous features of the present invention will be apparent from the specification and claims.

The nature and characteristic features of the present invention will be more readily understood from the following description taken in connection with the accompanying drawings forming part hereof in which:

Figure 1 is a view in perspective showing the spraying apparatus of the present invention in position for use;

Fig. 2 is a side elevational view of the pressure tank with the spraying apparatus mounted thereon and in the storage position;

Fig. 3 is an end elevational view of the mounting shown in Fig. 2, as seen from the rear;

Fig. 4 is a vertical sectional view taken approximately on the line 4—4 of Fig. 3;

Fig. 5 is a fragmentary horizontal sectional view taken approximately on the line 5—5 of Fig. 3; and Fig. 6 is a fragmentary vertical sectional view taken approximately on the line 6—6 of Fig. 5.

It should, of course, be understood that the description and drawings herein are illustrative merely, and that various modifications and changes may be made in the invention disclosed without departing from the spirit of the invention.

Like numerals refer to like parts throughout the several views.

Referring now more particularly to the drawings, the portable spraying apparatus in accordance with the present invention, preferably includes a liquid container or tank 10 of suitable size and preferably made of metal. The container 10 is provided with a handle 11 secured to the top portion thereof and an adjustable belt 12, of suitable fabric material, having a plurality of hooks 13 at the ends thereof for removable engagement with brackets 14 on each side of the container 10 for mounting the container 10 on the back of the user.

The container 10 is provided in the top wall thereof with a fluid tight closure 15 of any preferred type. The container 10 is also provided in the interior thereof with a pump, the piston 16 of which is engaged by a rod 17. The lower end of the rod 17 is pivotally connected to a manually operable pump lever 18, the lever 18 being pivotally connected to a bracket 19 secured to the tank 10.

At one side of the top of the piston 16 a short tube 31 is provided to which a hose 32, preferably of rubber or similar flexible material is connected. The opposite end of the hose 32 is secured by a clamp 34, to a separable quick-locking union 35.

The structure heretofore described is well known in the portable tank field.

In accordance with the invention the union 35 is connected to an elbow 36. The elbow 36 is in threaded engagement with a vertically disposed hollow cylindrical filter chamber 37 having a suitable removable filter (not shown) enclosed therein. The chamber 37 is in threaded engagement with a reducing joint 40 which in turn is in threaded engagement with an elongated vertical pipe 41. The pipe 41, at its lower end, is connected to an elbow 42 which faces outwardly with respect to the container 10 and is in turn in threaded engagement with the side of one end of a hollow horizontal cylinder 43 which is disposed transversely to the joint 42. A hollow cylindrical section 44 is provided in pivotal engagement, axial alignment and communication with the cylinder 43 is disposed on the opposite end of the cylinder 43 from the joint 42 and has threaded opening therein for threaded engagement with an elongated pipe section 45 forming the main part of a boom B.

The pipe 45 is preferably made of a lightweight material, such as aluminum, and is provided with a pet-cock type valve 46, near the place of junction with the section 44, for easy convenient turning of the flow on or off by the user as will be fully explained hereinafter. The pipe 45, at a plurality of locations, is provided with four way cross type pivotal joints 47 in threaded engagement therewith. At each of the joints 47, and in communication with the pipe 45, a pipe section 48 is provided extending vertically upwardly and a pipe section 49 is provided extending vertically downwardly, the pipe sections 48 and 49 preferably being made of a lightweight material such as aluminum.

The pipes 48 have elbows 50 therein to which pipe sections 51 are connected. The pipe sections 51 have elbows 52 extending vertically downwardly to which pipe sections 53 are connect in generally spaced parallel relation with the pipe sections 48. At the ends of each of the pipe sections 53 a divergently spraying nozzle 54 is provided in threaded engagement therewith disposed generally downwardly for purposes to be hereinafter more fully described. Similarly, elbows 55 are provided at the lower ends of the pipe sections 49 to which pipe sections 56 of suitable length are connected. At each of the outer ends of the pipe sections 56 elbows 57 are provided extending vertically downwardly with elongated pipe sections 60 connected thereto in generally spaced parallel relation with the pipe sections 49. Elbows 61 at the lower ends of each of the pipe sections 60 extend generally transversely to the axis of the pipe 45 and in an opposite direction from the pipe sections 56. Short pipe sections 62 are provided, connected to the elbows 61. At the outer end of each of the pipe sections 62 an angularly disposed divergently spraying nozzle 63 is provided, preferably in threaded engagement therewith. An additional nozzle 64 may also be provided angularly and oppositely disposed with respect to the nozzle 63 and angularly with the pipe section 62 to increase the spray coverage to be more fully described hereinafter. Generally, an additional nozzle 64 is desirable on the inner members of the boom B.

A clamp 70 is provided, secured at a suitable location on the pipe 45 for removable engagement with one end of a supporting chain 71 or the like. A clamp 72 is provided on the pipe 41, having a transversely disposed eye bolt 73 in secured engagement with the clamp 72. The bolt 73 while holding the clamp 72 in fixed position preferably engages the other end of the chain 71 for the support of the boom B, to be more fully explained hereinafter. The clamp 72 has an integral outer horizontal strip 74 which extends outwardly from the pipe 41 then bends abruptly generally ninety degrees and terminates a short distance there beyond in an inwardly turned hook 74a for purposes to be hereinafter explained.

Vertically spaced brackets 25 and 26 secured to the container 10 each have mounted thereon a V-shaped socket 75. An elongated open tubular bracket 76 is provided having secured, in any suitable manner, to an exterior back portion thereof in spaced vertical alignment, V-shaped members 77 for removable engagement with the sockets 75 to provide easy attachability and detachability of the bracket 76. The bracket 76 is provided, perimetrically disposed along the interior of the lower portion thereof, with a plurality of horizontally spaced struck in portions 78 for purposes to be hereinafter explained. An elongated coiled spring 80 is provided in axial encompassing relation with the pipe 41, having its lowermost portion in a flat horizontally disposed washer 81 which in turn rests on the struck in portions 78. The interior diameter of the spring 80 is generally of the order of twice that of the pipe 41 in order to permit free sliding action of the pipe 41 to be more fully explained hereinafter. Positioned above the spring 80 on the pipe 41 a flat horizontally disposed washer 81a is provided in slidable engagement with the uppermost portion of the spring 80.

Superposed on the washer 81 a U-shaped bracket 82 is provided with the open part thereof disposed inwardly with respect to and partially within the bracket 76. Suitably sized and placed holes 83 are provided in the bracket 82, one in each of the legs thereof, to permit adjustable sliding passage of the tube 41. Within the bracket 82 centrally positioned therein and disposed transversely with respect to the axis of the pipe 41 an eyebolt 84 is provided having is eye disposed to slidably engage the pipe 41. The eyebolt 84 extends horizontally outwardly through a suitably sized and placed hole in the bracket 82 and is threaded for adjustable and removable engagement by a wing nut 85.

At the bracket 26 a horizontally disposed outwardly extending strip 86 is provided secured thereto in any suitable manner. The strip 86 has an outer end 87 on which an elongated flat lever 90 is pivotally mounted with a coil spring 91, one end of which is secured to the strip 86 and the other end of which is secured to the lever 90 for urging the lever 90 into a predetermined position. The lever 90 at the lower end thereof has an integral flat section 92 to provide a gripping surface for manipulating the lever 90. The opposite end of the strip 90 from the section 92 is provided with an integral pointed hook 93 disposed generally transverse to the axis of the strip 90 for purposes to be hereinafter explained more fully.

The mode of operation will now be pointed out.

The container 10 having the spraying fluid therein is positioned on the back of the user by use of the adjustable belt 12 which is placed on the user in a customary knapsack manner. The hooks 13 on the belt 12 are then secured to the container 10 so that the container 10 can be carried in contact with the back of the user. The container 10 is preferably adjusted to suit the height of the user. The adjustment to compensate for the height of the user is effected by compressing the spring 80 in the bracket 76 a downward force being exerted on the bracket 82 for this purpose. At the desired spring compression the wing nut 85 is tightened holding the bracket 82 on the tube 41 at the desired setting. To adjust the container 10 and also the boom B to the proper spraying elevation, the tube 41 is thrust downwardly carrying the bracket 82 with it and compressing the spring 80 further until the predetermined setting is reached at which point the lever 90, manipulated by the hand of the user at the section 92, is brought into engagement by the use of the hook 93, with the bracket 82. The setting of the spring 80 is maintained by the interaction of the parts concerned, affected by the upward urging of the spring 80.

The boom B can be attached to the container 10 at any suitable time before spraying but is preferably assembled before the user positions the container 10 on his back. The boom B is connected at the section 44. When not in use the pipe 45 of the boom B is preferably pivoted into a vertical position by a simple manual operation and held in place by the hook end of the strip 74.

To prepare for the spraying operation the boom B is disengaged from the strip 74 and pivoted into a generally horizontal position, and is supported by the chain 71 in engagement with the clamps 70 and 72. The user effects the spraying operation by exerting repetitive alternating pumping forces on the lever 18 which activates the piston 16 through the action of the rod 17 forcing the spraying solution through the various tubular parts to the boom B and thence to the vegetation concerned. The filter in the chamber 37 removes any particles in the spray. The petcock valve 46 is positioned in the pipe 45 at a place within easy access of the left hand of the user for turning the spray on or off.

The pipes 48 and 49 may be positioned in accordance with the spacing of the rows to be sprayed and the nozzles 54, 63 and 64 can be angularly adjusted to obtain the maximum results under instant conditions. The constituent parts of the boom B are constructed to give maximum spraying benefits from above, below and the sides of the plants concerned. The boom B as shown provides for simultaneously spraying two rows although by the addition of pipes 45 up to four rows can be sprayed in a single operation. When the spraying operation is concluded the petcock 46 is turned to off position and boom B may be pivotally manipulated to a vertical position and secured to the hook part 74a of the strip 74.

The boom B can then be raised vertically so that the lower parts thereof will be above the lowest resting surface of the container 10. This is accomplished by disengaging the hook 93 from the bracket 82 thereby freeing the spring 80 to define its normal upwardly urging position until the predetermined setting with the bracket 82 is reached. It is important to retract upwardly the boom B when not in use in order to protect the lower parts of the boom B from possible damage and to remove any possibility of clogging of the nozzles 54, 63 and 64 with dirt or other foreign material. With the boom B upwardly and vertically positioned, the container 10 can be removed from the back of the user and carried by the handle or set upon the floor or ground without fear of damage to the parts concerned.

Upon setting the boom B for a particular height of spraying by a particular user, if spraying is discontinued the booms B may be readily moved to the set position for further spraying.

I claim:

1. Portable spraying apparatus comprising a spray container of the back carry type having internal pressure developing means, a vertical tube mounted on a side wall portion of the container, a fluid connection from said vertical tube to the interior of said container, a spray distributing tube pivotally connected at one end to said vertical tube, a plurality of spray dispensing arms connected to said distributing tube, and adjustable means for positioning said vertical tube on said side wall portion.

2. Portable spraying apparatus comprising a spray container of the back carry type having internal pressure developing means, a vertical tube mounted on a side wall portion of the container, a fluid connection from said vertical tube to the interior of said container, a spray distributing tube pivotally connected at one end to said vertical tube and movable from a vertical to a horizontal position, a plurality of spray dispensing arms connected to said distributing tube, and adjustable means for positioning said vertical tube on said side wall, said last means including a resilient member for urging said vertical tube in one direction, an adjustable abutment on said vertical tube with which said resilient member is in engagement, and a releasable latching member for engagement with said abutment member.

3. Portable spraying apparatus comprising a spray container of the back carry type having internal pressure developing means, a vertical tube mounted on a side wall portion of the container and movable to a position projecting below said container, a fluid connection from said vertical tube to the interior of said container, a spray distributing tube pivotally connected at one end to said vertical tube and movable from a vertical to a horizontal position, a plurality of spray dispensing arms connected to said distributing tube, and adjustable means for positioning said vertical tube on said side wall, said last means including a resilient member for urging said vertical tube upwardly, an adjustable abutment on said vertical tube with which said resilient member is in engagement, and a releasable latching member for engagement with said abutment member.

4. In portable spraying apparatus for a spray container of the back carry type having internal pressure developing means, the combination comprising a supporting member detachably mounted on a side wall portion of the container, a vertical tube carried by said supporting member and movable to a position projecting below said container, a fluid connection from said vertical tube to the interior of said container, a spray distributing tube connected at one end to said vertical tube, a plurality of spray dispensing arms connected to said distributing tube, and adjustable means for positioning said vertical tube with respect to said supporting member.

5. In portable spraying apparatus for a spray container of the back carry type having internal pressure developing means, the combination comprising a supporting member mounted on a side wall of the container, a vertical tube carried by said supporting member and movable to a position projecting below said container, a fluid connection from said vertical tube to the interior of said container, a spray distributing tube pivotally connected at one end to said vertical tube, a plurality of spray dispensing arms connected to said distributing tube, and adjustable means for positioning said vertical tube on said side wall, said last means including a resilient member for urging said vertical tube upwardly, an adjustable abutment on said vertical tube with which said resilient member is in engagement, and a releasable latching member for engagement with said abutment member.

6. A portable spraying apparatus comprising a spray container of the back carry type having pressure developing means, an elongated vertical tube mounted on a wall portion of the container and having its upper end in communication with the interior of said container, adjustable means for vertically positioning said vertical tube with respect to said wall portion, a spray distributing tube having one end in pivotal engagement with said vertical tube, a plurality of spray dispensing arms pivotally mounted on said distributing tube in spaced relation and a plurality of nozzles adjustably mounted on each of said dispensing arms at the opposite end of said arms from said distributing tube.

7. Spraying apparatus as defined in claim 6 in which members are provided for adjusting the vertical position of said vertical tube.

8. In spraying apparatus for a back carry type of spray container, the combination comprising an elongated supporting member detachably mounted on a side wall portion of the container, an elongated vertical tube extending within said supporting member and having its upper end in communication with the interior of said container, a boom tube in pivotal engagement with said vertical tube, said boom tube having a plurality of spaced adjustable nozzles, said supporting member having inwardly extending abutments, an elongated coil spring carried on said tube in engagement with said abutments a first locking member adjustably carried on said tube in engagement with said spring and a second locking member pivotally mounted on said supporting member for engagement with said first locking member.

9. In spraying apparatus for a back carry type of spray container, the combination comprising an elongated vertical bracket arcuate in horizontal cross section mounted on a side wall portion of the container, an elongated vertical tube extending within said supporting member and having its upper end in communication with the interior of said container, said vertical tube being movable to a position with a portion extending below the container, a boom tube in pivotal engagement with said vertical tube having a plurality of spaced adjustable nozzles, said bracket member having inwardly extending abutments, an elongated coil spring carried on said tube in engagement with said abutments, a first locking member adjustably mounted on said tube in engagement with said spring and having a portion extending outwardly from said bracket, and a second locking member pivotally mounted on said bracket for engagement with said outwardly extending portion of said first locking member.

References Cited in the file of this patent

UNITED STATES PATENTS

| Number | Name | Date |
|---|---|---|
| 510,287 | Peppler | Dec. 5, 1893 |
| 2,162,057 | Brandt | June 13, 1939 |
| 2,594,223 | Santarelli | Apr. 22, 1952 |